United States Patent

Schenk

(10) Patent No.: US 9,387,540 B2
(45) Date of Patent: Jul. 12, 2016

(54) DRILL CHUCK

(71) Applicant: Peter Schenk, Niederstotzingen (DE)

(72) Inventor: Peter Schenk, Niederstotzingen (DE)

(73) Assignee: ROEHM GMBH, Sontheim (DE)

( * ) Notice: Subject to any disclaimer, the term of this patent is extended or adjusted under 35 U.S.C. 154(b) by 322 days.

(21) Appl. No.: 14/086,125

(22) Filed: Nov. 21, 2013

(65) Prior Publication Data

US 2014/0167368 A1  Jun. 19, 2014

(30) Foreign Application Priority Data

Dec. 13, 2012 (DE) .................... 10 2012 112 208

(51) Int. Cl.
*B23B 31/12* (2006.01)

(52) U.S. Cl.
CPC ......... *B23B 31/1238* (2013.01); *B23B 2226/61* (2013.01); *B23B 2231/38* (2013.01); *B23B 2231/44* (2013.01); *Y10S 279/902* (2013.01); *Y10T 279/17623* (2015.01); *Y10T 279/17632* (2015.01); *Y10T 279/32* (2015.01)

(58) Field of Classification Search
CPC ............ B23B 31/1238; B23B 2226/61; B23B 2231/38; B23B 2231/44; Y10T 279/17615; Y10T 279/17623; Y10T 279/17632; Y10T 279/17641; Y10T 279/17649; Y10T 279/17658; Y10S 279/902
See application file for complete search history.

(56) References Cited

U.S. PATENT DOCUMENTS

| 5,984,320 | A | * | 11/1999 | Nakamura | .......... | B23B 31/1238 |
| | | | | | | 279/140 |
| 6,045,141 | A | | 4/2000 | Miles | | |
| 6,129,363 | A | * | 10/2000 | Mack | .................. | B23B 31/1215 |
| | | | | | | 279/158 |
| 6,390,481 | B1 | * | 5/2002 | Nakamuro | ............ | B23B 31/123 |
| | | | | | | 279/140 |
| 6,428,018 | B1 | * | 8/2002 | Aultman | ............. | B23B 31/1215 |
| | | | | | | 279/140 |
| 6,572,310 | B2 | * | 6/2003 | Temple-Wilson | .. | B23B 31/1238 |
| | | | | | | 408/239 A |
| 7,128,324 | B2 | | 10/2006 | Yang et al. | | |
| 7,185,895 | B2 | * | 3/2007 | Cachod | ................. | B23B 31/123 |
| | | | | | | 279/140 |
| 2002/0192043 | A1 | * | 12/2002 | Lin | ..................... | B23B 31/1238 |
| | | | | | | 408/124 |
| 2003/0026670 | A1 | | 2/2003 | Temple-Wilson | | |
| 2007/0241519 | A1 | * | 10/2007 | Zhou | ................... | B23B 31/1238 |
| | | | | | | 279/62 |

FOREIGN PATENT DOCUMENTS

| FR | EP 1419837 A1 * | 5/2004 | ............ B23B 31/123 |
| GB | 2353238 A | 2/2001 | |

* cited by examiner

Primary Examiner — Eric A Gates
(74) Attorney, Agent, or Firm — Andrew Wilford

(57) ABSTRACT

A drill chuck has a chuck body centered on an axis, made of plastic, and formed with an axially rearwardly open drive-spindle seat, at least one axially extending slot of ring-segment section opening radially inward into the seat, an axially forwardly open tool-holding cavity, and a plurality of angled jaw guides. Respective jaws are movable in the guides and engaged by a threaded ring axially fixed on the body and rotatable about the axis thereon. A tightening sleeve rotatable about the axis on the body is connected to the ring for rotating same.

11 Claims, 5 Drawing Sheets

DRILL CHUCK

FIELD OF THE INVENTION

The present invention relates to a chuck. More particularly this invention concerns a drill chuck.

BACKGROUND OF THE INVENTION

A standard drill chuck has a chuck body made of plastic, in particular fiber-reinforced plastic, and forming a drive-spindle seat and a tool-holding cavity. Tool-gripping jaws are guided in the body for movement by a threaded ring, and a tightening sleeve is provided that operates the threaded ring.

BACKGROUND OF THE INVENTION

Drill chucks of the above-described type have been disclosed, for example, in U.S. Pat. No. 6,045,141. A drill chuck is described therein that comprises a cast body having a gripping surface on its end that is formed with the drive-spindle seat. In the cast body of this chuck, the problem arises, however, that stresses are generated as the body cures, and this factor negatively affects the strength, load capacity, and service life of the body.

OBJECTS OF THE INVENTION

It is therefore an object of the present invention to provide an improved drill chuck.

Another object is the provision of such an improved drill chuck that overcomes the above-given disadvantages, in particular that avoids the above-referenced disadvantages.

SUMMARY OF THE INVENTION

A drill chuck has according to the invention a chuck body centered on an axis, made of plastic, and formed with an axially rearwardly open drive-spindle seat, at least one axially extending slot of ring-segment section opening radially inward into the seat, an axially forwardly open tool-holding cavity, and a plurality of angled jaw guides. Respective jaws are movable in the guides and engaged by a threaded ring axially fixed on the body and rotatable about the axis thereon. A tightening sleeve rotatable about the axis on the body is connected to the ring for rotating same.

This ensures that the wall thickness at the drive-spindle seats is the same as the wall thickness at the tool-holding cavity, and as a result any wall-strength-dependent effects are completely prevented or reduced during the curing process.

An approach has furthermore been found advantageous whereby a support flange that has been formed in one piece with the body is provided at the end of the body around the drive-spindle seat. This support flange radially guides the tightening sleeve, and the support flange is formed with holes that are aligned with the tool-gripping jaws. Guiding the tightening sleeve on the end of the body accommodating the drive-spindle seat by the support flange, in particular, enables concentricity characteristics to be improved for the tightening sleeve of the drill chuck according to the invention. Providing the holes aligned with the tool-gripping jaws also ensures that place holders for the tool-gripping jaws can be removed from the end of the body that accommodates the drive-spindle seat after the body has been cast. This significantly simplifies the production process, and it also enables guides to be created for tool-gripping jaws that are of non-circular cross-section.

An approach has furthermore been found especially advantageous whereby multiple slots, in particular, three slots are provided. The fact that the slots are angularly offset in the body between the holes enables the wall thickness of be adjusted precisely. It is also advantageous to use appropriate place holders to form the slots when molding the body. Since the wall thickness is significantly greater, in particular, at the drive-spindle seat than at the tool-holding cavity, it is furthermore advantageous if the axial lengths of the slot are set according to the axial depth of the drive-spindle seat; in other words, the slot length is not set exactly equal to the axial dimension of the spindle seat. Provision is also made within the scope of the invention whereby the width of the slots that are open at the rear body end at the drive-spindle seat is the same as the diameter of the support flange.

It has furthermore been found advantageous if a seat holding a metal closure disk or support washer is provided at the end of the body around the drive-spindle seat. The metal closure disk enables the body to be locally reinforced at the drive-spindle seat that constitutes a vulnerable point for the body. It has furthermore been found advantageous in this regard if the closure disk is able to radially guide for the tool-gripping jaws. This approach easily enables a local reinforcement of the body to be implemented in a region that is frequently highly stressed, in particular, in the case of chuck bodies in which the tool-gripping jaws project rearward from the holes.

It has furthermore been found advantageous if at least one tab is provided on the closure disk in order to cover at least one of the slots. This not only provides a simple design for positive engagement between the body and the closure disk, it also prevents contamination from entering the slots when the drill is operating.

In order to securely seat the closure disk, it has also been found advantageous for the seat securing the closure disk to have an undercut. This allows the closure disk to be simply snapped onto the seat. Provision is also made within the scope of the invention, however, whereby the closure disk is cast on or attached by other known means.

It is especially advantageous to provide a thrust ring that is rotationally fixed by positive engagement to the body in order to axially support the threaded ring on the body. Supporting the threaded ring on the thrust ring, in particular, means that the body is not under direct load, thereby enabling the service life of the body to be increased. The rotationally fixed attachment of the thrust ring to the body also has a positive effect on assembly cost, and can be carried out for example by an approach where at least one recess is formed in the body and a number of bumps corresponding to the number of recesses is formed on the thrust ring, thereby precluding any rotation of the thrust ring relative to the body.

It has furthermore been found advantageous if the outer surface of the thrust collar carries a ratchet teeth into which a locking element on the threaded ring can be pressed by a cam provided on the tightening sleeve. This enables the threaded ring to be rotationally fixed to the body, thereby preventing any unintentional misadjustment of the tool-gripping jaws.

It has furthermore been found advantageous within the scope of the invention if a retaining ring is provided on the body at the tool-holding cavity. The retaining ring enables the body to be locally reinforced at the tool-holding cavity, thereby allowing smaller wall thicknesses to be created for the body and thus providing a very compact drill chuck.

It has been found advantageous for the inner surface of the retaining ring to be provided with teeth in order to improve the concentricity characteristics of the drill chuck according to the invention. It is specifically advantageous here if the height of the teeth in one region ranges between 0.15 m and 0.60 mm, if valleys between the teeth are rounded, and if the number of teeth ranges between 80 and 200. When the retaining ring is attached to the body, the teeth redistribute material, thereby ensuring, in particular, that the production tolerances due to the manufacturing process are compensated out.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
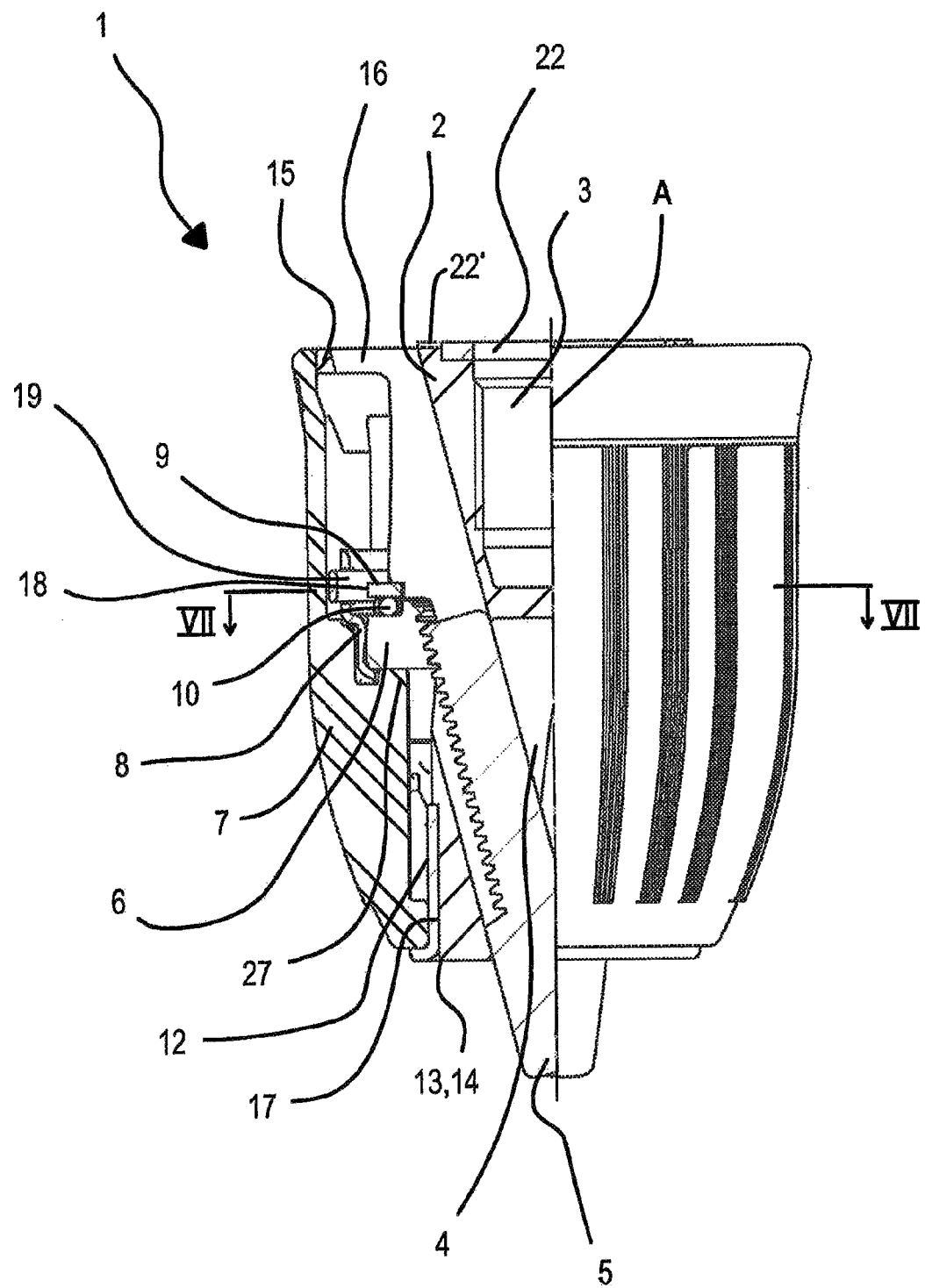
FIG. 1 is a partly sectional view of an embodiment of a drill chuck according to the invention.

As seen in FIG. 1 a drill chuck 1 according to the invention has a body 2 that is made of a fiber-reinforced plastic and centered on an axis A. The body 2 is formed with an axially rearwardly open and internally threaded drive-spindle seat 3 adapted to receive a drill spindle of a drill, and an axially forwardly open tool-holding cavity 4. Tool-gripping jaws 5 are provided in the body 2 and can be shifted obliquely relative to the chuck axis A in the known manner in respective guide grooves.

A tightening sleeve 7 is provided to rotate a metal threaded ring 6 that in the illustrated embodiment acts through an intermediate sleeve 8 on the threaded ring 6 but that can also be directly connected with it. The threaded ring 6 is braced axially rearward on the body 2 toward the seat 3 by a metal thrust ring 9 and by a ball bearing 10. The threaded ring 6 is braced forward toward the tool cavity 4 through a collar-like support shoulder 27 of the tightening sleeve 7.

The tightening sleeve 7 in turn is braced by a metal retaining ring 12 that surrounds the outer surface of the body 2 at the tool cavity 4. The ring 12 here has a flange or collar 14 that is braced axially against the tightening sleeve 7 and that in the embodiment shown in FIG. 1 also forms a stop face 13 that protects the body 2 from damage at the tool cavity 4.

In the embodiment shown in FIG. 1, a support flange 15 radially supports and guides the tightening sleeve 7 on the end of the body 2 having the drive-spindle seat 3 and is formed in one piece with the body 2. The flange 15 here is formed with holes 16 that are aligned with the jaws 5 and their guides and facilitate manufacture of the body 2. To accomplish this, when making the body 2, the holes 16 are cast directly into it with the aid of appropriate place holders that are removed after the body 2 has been cast. This then allows the body 2 to be made in one production step without requiring the costly operation of machining the guides for the jaws 5 into the body 2 after casting the body 2.

In addition, the chuck 1 according to the invention only requires a very small number of parts, and this construction furthermore enables its assembly to be simplified. The threaded ring 6 is first fitted to the body 2, followed by the tightening sleeve 7 that bears on the body 2 around the drive-spindle seat 3. The ring 12 is then fitted to the body 2, thereby axially securing the tightening sleeve 7 and the threaded ring 6 by the collar 14 of the ring 12.

Figure 2:
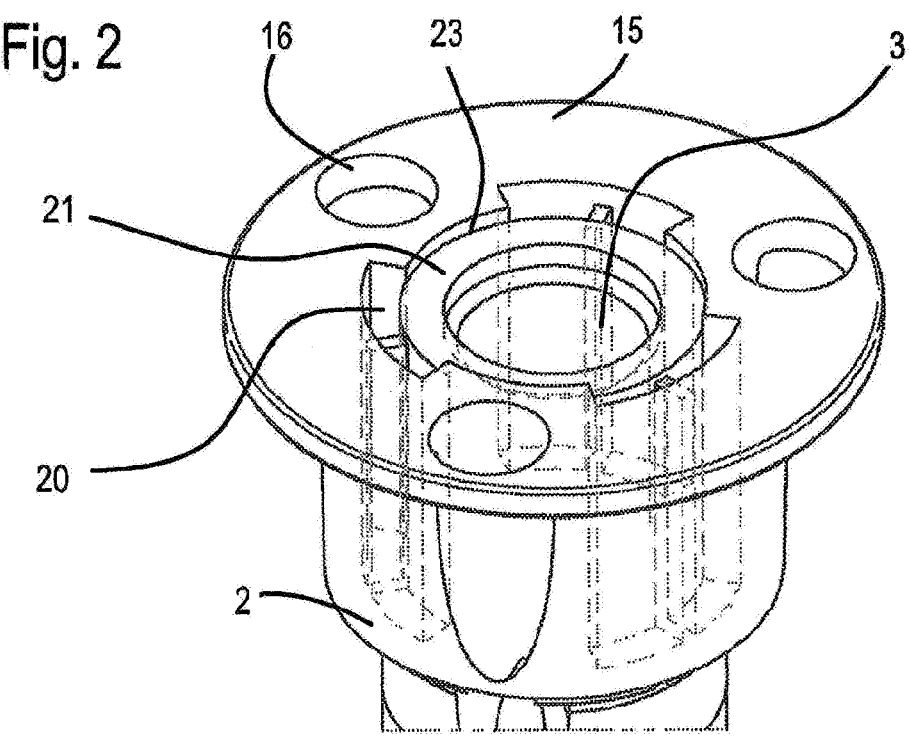
FIG. 2 is a perspective view of the body.

FIG. 2 is a perspective view of the fiber-reinforced plastic body 2. This view shows that the body 2 is formed with an annular array of axially extending slots 20 of ring-segment section opening radially inwardly into the drive-spindle seat 3 and formed in the body 2 during its manufacture. Thus each slot has a part-cylindrical floor extending parallel to the axis A and with a center of curvature at the axis A and two planar and radially extending side flanks. The axial length of the slots 20 here is essentially the same as the axial depth of the drive-spindle seat 3 so that the wall thickness of the body 2 is essentially uniform along its axial extent. This ensures that during curing of the body 2 different material thicknesses do not create defects that would negatively impact the strength and concentricity characteristics of the body 2.

FIG. 2 also shows the support flange 15 that is formed in one piece with the body 2, that radially centers the tightening sleeve 7, and that is formed with holes 16 that are aligned with the jaws 5 and that make it possible to produce the body 2 easily and cost-effectively in a single molding operation. In addition, a seat 21 holding a metal closure disk 22 (FIG. 1) is formed at the rear end of the body 2 around the drive-spindle seat 3. This seat 21 includes an undercut 23 into which the closure disk 22 can be snapped. The disk 22 may have a radial flange extension such as shown at 22' in FIG. 1 that extends to the edges of the holes 16 so as to be able to radially inwardly brace the jaws 5 when they project back past the back face of the body 2.

Figure 3:
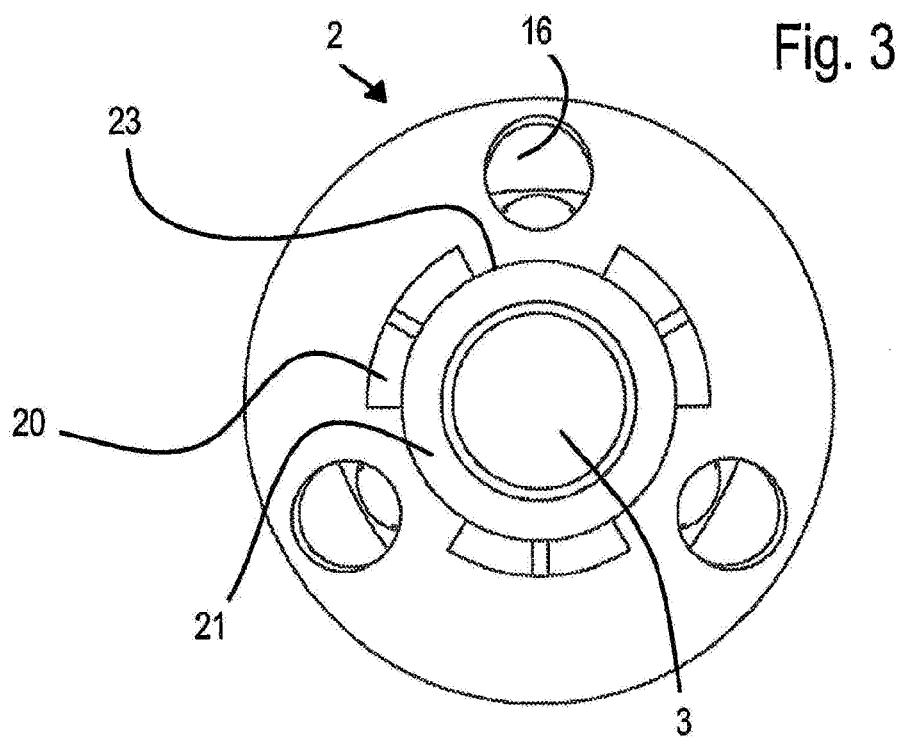
FIG. 3 is an end view of the rear face of the body.

FIG. 3 is a rear end view of the body 2. Once again highlighted here, in particular, are the flange 15 and the holes 16 provided in the flange 15 and aligned with the jaws 5. In addition, FIG. 3 also shows the slots 20 into which the seat 21 opens in the illustrated embodiment so as to allow the metal closure disk 22 to be inserted with positive engagement, to which end the disk 22 has radially outwardly projecting tabs 24. This results in the slots 20 being closed by the disk 22, thereby preventing particles from getting into the slots 20.

Figure 4:
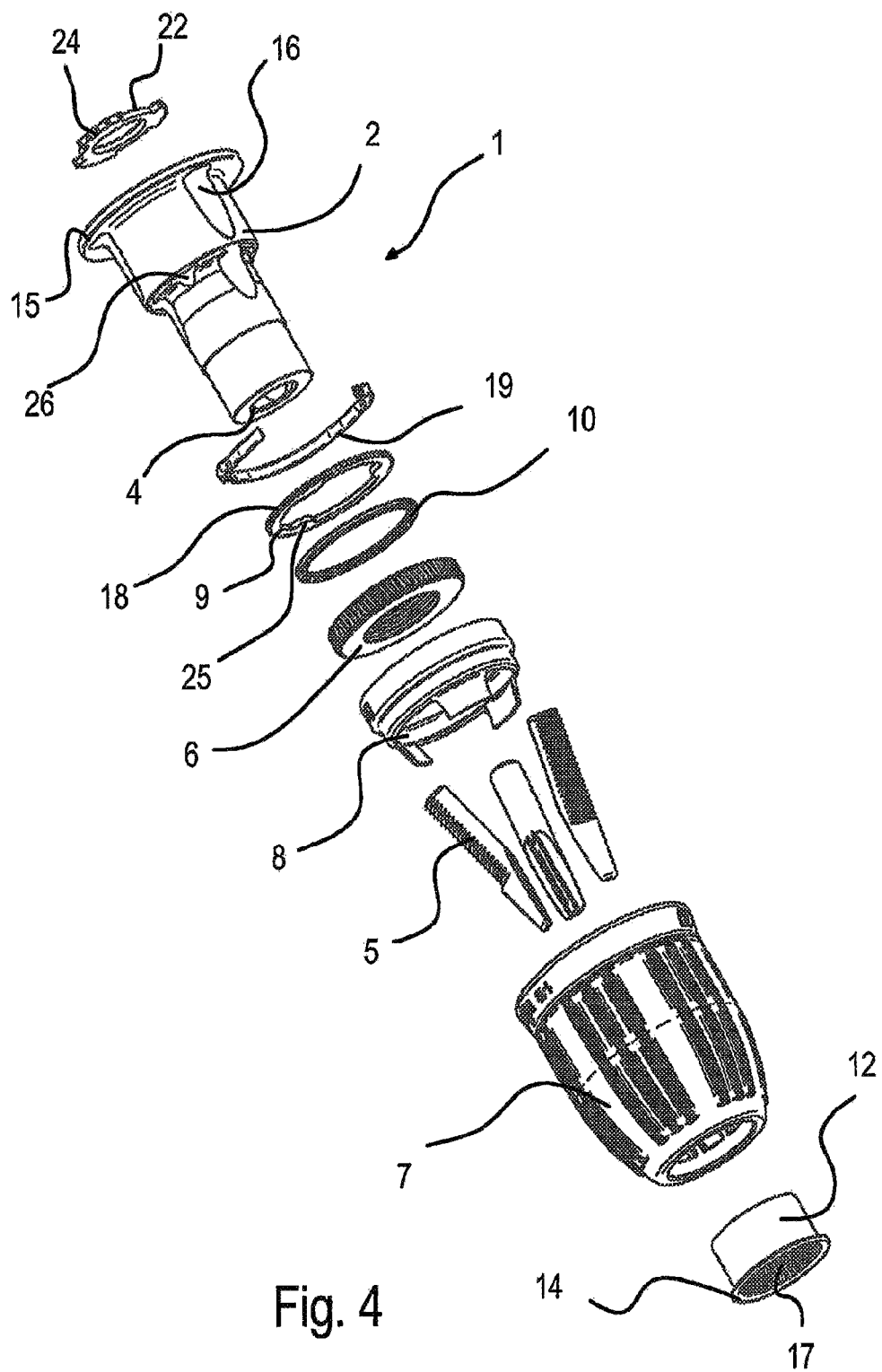
FIG. 4 is an exploded view of the drill chuck of FIG. 1.

FIG. 4 clearly illustrates that the outer surface of the thrust ring 9 is formed with external teeth 18 with which a spring-like locking element 19 can be engaged. To this end the locking element 19 has a tip 19a (FIG. 7) radially engageable with the teeth 18, a first bump 19b engageable in a cam recess 7b of the tightening sleeve 7 in the unlocked position, and a bump 19c passing through a hole 8a in the intermediate sleeve and that can shift between end recesses 7a in the tightening sleeve 7. When the bump 19c is moved by the sleeve 8 between the recesses 7a it moves it's the bump 19b into or out of the cam formation 7b and thereby brings it's the tip 19a into locking engagement with the teeth 18 or out of engagement with them. It also is possible when the teeth 18 are sawteeth that only one-way blocking is produced in the engaged position.

FIG. 4 also shows the metal closure disk 22 that locally reinforces the body 2 at the drive-spindle seat 3. The disk 22, which is made of metal, has the radially projecting tabs 24 so as to be positively angularly locked to the body 2. The inner surface of the ring 12 is formed with internal teeth 17 in order to improve the concentricity of the body 2 and to compensate for tolerances due to the production process. This results in a plastic deformation of the body 2 when the ring 12 is pressed onto the body 2.

Figure 5:
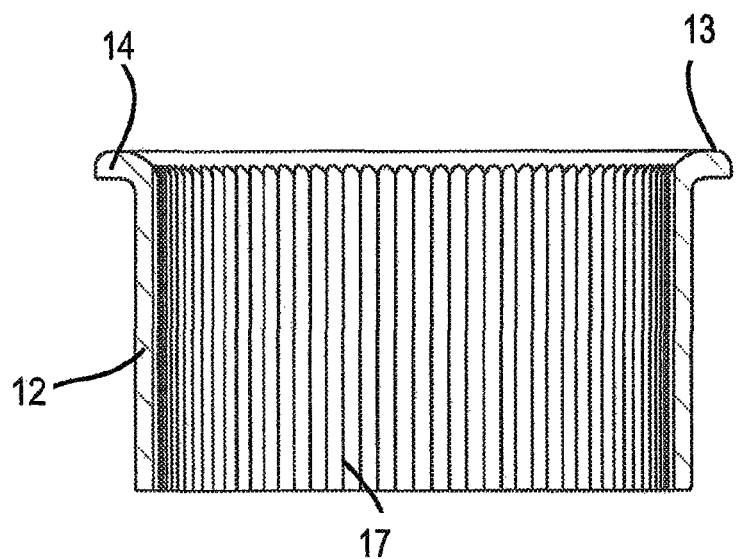
FIG. 5 is a sectional view through a toothed retaining ring.
Figure 6:
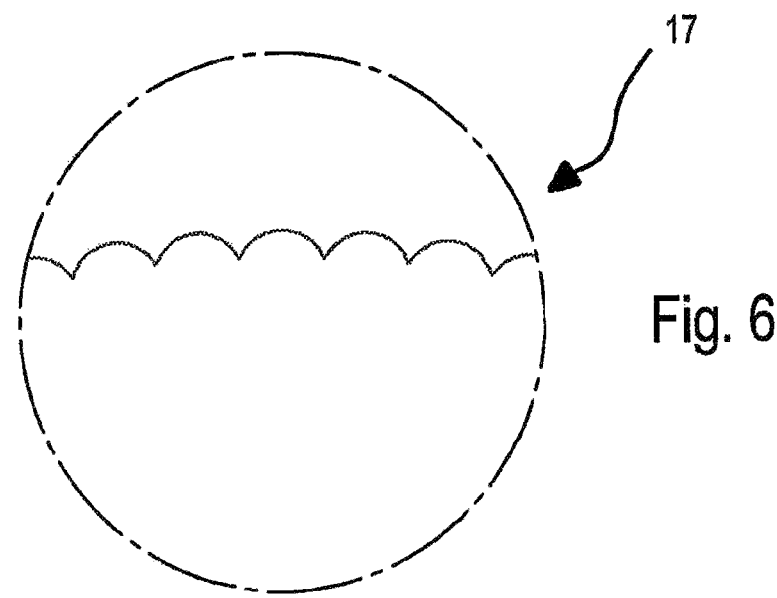
FIG. 6 is a large-scale detail view showing the teeth of the retaining ring.

FIG. 5 is a sectional view of the ring 12 showing the teeth 17 on its inner surface. There are about 120 teeth in the embodiment shown in FIG. 5. As can be seen in the detail view of the teeth 17 of FIG. 6, the teeth 17 are separated by rounded valleys whose radius of curvature is about 0.16 mm in the illustrated embodiment. The angle between adjacent tooth flanks measures 60°, while the radial height of the teeth 17 is around 0.25 mm. The material deformation of the body 2 can be positively modified by the varying these parameters.

Figure 7:
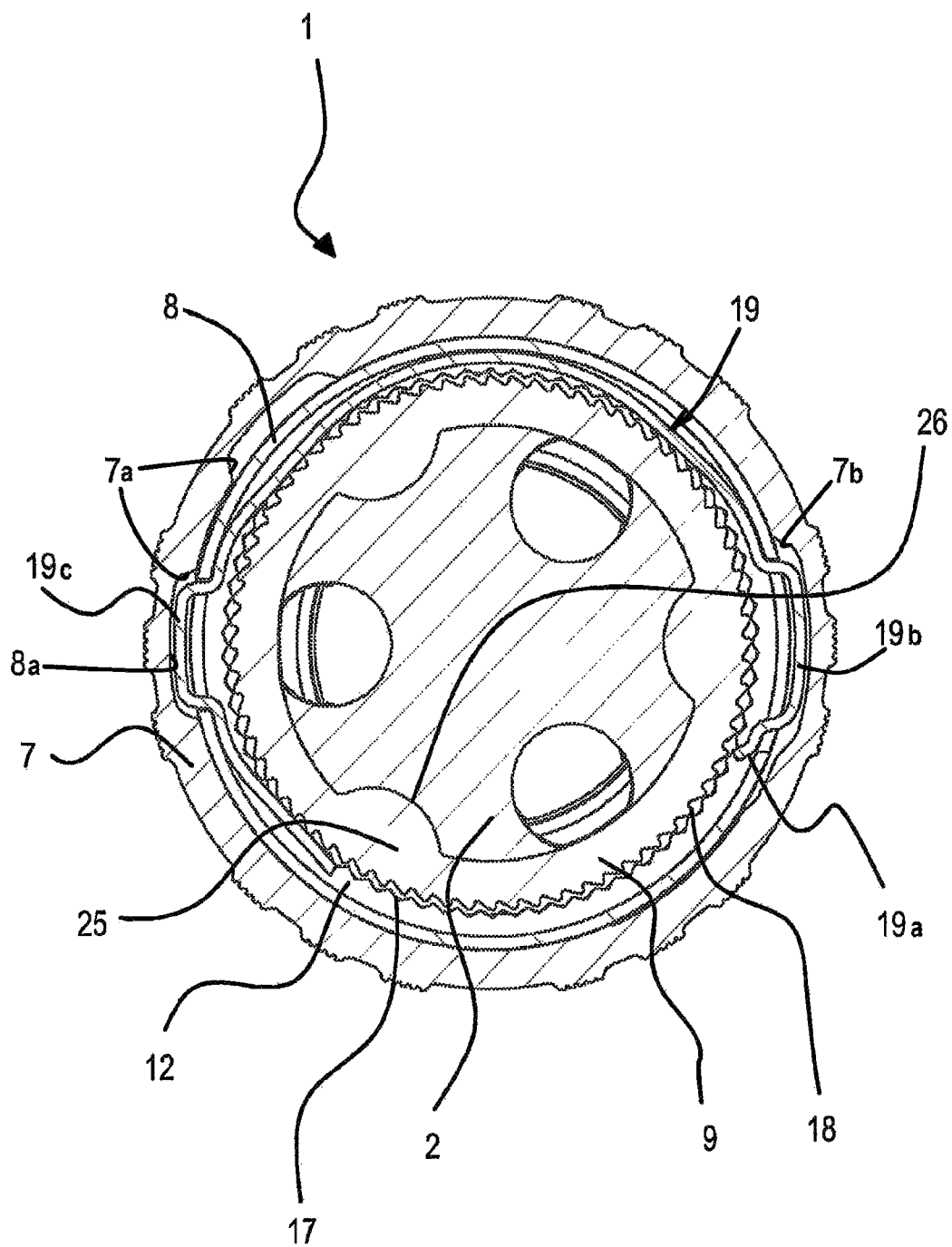
FIG. 7 is a sectional view along plane VII-VII of FIG. 1.

The sectional view in FIG. 7 shows the thrust ring 9 that is rotationally fixed to the body 2 and is provided to axially support the threaded ring 6 on the body 2 and carry the teeth 18. In order to rotationally fix the thrust ring 9 to the body 2, it is formed with bumps 25 that fit into corresponding recesses 26 of the body 2. The teeth 18 make it possible to prevent any relative rotation between the threaded ring 6 and the body 2, which rotation could in some cases result in an unwanted movement of the jaws 5. To this end, the intermediate sleeve 8 that is rotationally fixed to the threaded ring 6 carries the locking element that reaches through the intermediate sleeve 8, and can be engaged and disengaged from the ratchet teeth 18 provided on the thrust ring 9 by the cam on the tightening sleeve 7.

I claim:

1. A drill chuck comprising:
   a chuck body centered on an axis, made of plastic, and formed with
      an axially rearwardly open drive-spindle seat,
      a plurality of axially extending slots of ring-segment section opening radially inward into the seat and angularly equispaced about the axis, and
      an axially forwardly open tool-holding cavity, and
      a plurality of angled jaw guides;
   respective jaws movable in the guides;
   a threaded ring axially fixed on the body, rotatable about the axis thereon, and threadedly engaging the jaws; and
   a tightening sleeve rotatable about the axis on the body and connected to the ring for rotating same.

2. A drill chuck comprising:
   a chuck body centered on an axis, made of plastic, and formed with
      an axially rearwardly open drive-spindle seat,
      at least one axially extending slot of ring-segment section opening radially inward into the seat,
      an axially forwardly open tool-holding cavity,
      a plurality of angled jaw guides, and
      a support flange axially level with the seat and formed with axially throughgoing holes aligned with the guides;
   respective jaws movable in the guides;
   a threaded ring axially fixed on the body, rotatable about the axis thereon, and threadedly engaging the jaws; and
   a tightening sleeve rotatable about the axis on the body and connected to the ring for rotating same, the support flange radially outwardly engaging the tightening sleeve to center same.

3. A drill chuck comprising:
   a chuck body centered on an axis, made of plastic, and formed with
      an axially rearwardly open drive-spindle seat,
      a seat groove at a rear face of the body open axially rearwardly and radially inwardly into the drive-spindle seat,
      at least one axially extending slot of ring-segment section opening radially inward into the seat,
      an axially forwardly open tool-holding cavity, and
      a plurality of angled jaw guides;
   respective jaws movable in the guides;
   a threaded ring axially fixed on the body, rotatable about the axis thereon, and threadedly engaging the jaws;
   a tightening sleeve rotatable about the axis on the body and connected to the ring for rotating same; and
   a metal support washer fitted in the seat and having an inner periphery exposed in the drive-spindle seat, whereby a drive spindle in the seat is braced radially against the support washer.

4. The drill chuck defined in claim 3, wherein the guides open at holes on a rear face of the body and the support washer extends to the holes to radially inwardly brace the jaws in rearmost positions thereof.

5. The drill chuck defined in claim 3, wherein there are a plurality of the slots and the support washer is formed with respective tabs extending into and rearwardly closing the slots.

6. The drill chuck defined in claim 3, wherein the seat groove is undercut for a snap fit of the washer in the seat.

7. A drill chuck comprising:
   a chuck body centered on an axis, made of plastic, and formed with
      an axially rearwardly open drive-spindle seat,
      at least one axially extending slot of ring-segment section opening radially inward into the seat,
      an axially forwardly open tool-holding cavity, and
      a plurality of angled jaw guides;
   respective jaws movable in the guides;
   a threaded ring axially fixed on the body, rotatable about the axis thereon, and threadedly engaging the jaws;
   a tightening sleeve rotatable about the axis on the body and connected to the ring for rotating same and further formed with a forwardly directed shoulder;
   a metal thrust ring carried at least indirectly on the shoulder, the threaded ring rotationally slidable on the thrust ring, the thrust ring being rotationally fixed on the chuck body and formed with external teeth; and
   a locking element rotationally coupled to the tightening sleeve and shiftable between a position meshing with the teeth and preventing rotation of the sleeve and a position clear of the teeth.

8. The drill chuck defined in claim 7, wherein the tightening sleeve is provided with a cam formation interacting with the locking element and moving same between its positions.

9. A drill chuck comprising:
   a chuck body centered on an axis, made of plastic, and formed with
      an axially rearwardly open drive-spindle seat,
      at least one axially extending slot of ring-segment section opening radially inward into the seat,
      an axially forwardly open tool-holding cavity, and
      a plurality of angled jaw guides;
   respective jaws movable in the guides;
   a threaded ring axially fixed on the body, rotatable about the axis thereon, and threadedly engaging the jaws;
   a tightening sleeve rotatable about the axis on the body and connected to the ring for rotating same; and
   a metal retaining ring fitted around the body at the tool cavity and having a radially outwardly projecting flange bearing axially rearward on a front axial end of the tightening sleeve, the retaining ring being internally formed with axially extending tooth ridges force fitted to the body.

10. The drill chuck defined in claim 9, wherein the ridges have a radial height of 0.15 mm to 0.60 mm and are separated by rounded valleys.

11. The drill chuck defined in claim 10, wherein there are between 80 and 200 of the ridges.

\* \* \* \* \*